(12) United States Patent
Thakar et al.

(10) Patent No.: US 10,083,300 B2
(45) Date of Patent: Sep. 25, 2018

(54) SEGREGATING EXECUTABLE FILES EXHIBITING NETWORK ACTIVITY

(71) Applicant: McAfee, Inc., Santa Clara, CA (US)

(72) Inventors: Neeraj Thakar, Pune (IN); Amit Malik, Gurgaon (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/039,779

(22) PCT Filed: Dec. 27, 2013

(86) PCT No.: PCT/US2013/078065
§ 371 (c)(1),
(2) Date: May 26, 2016

(87) PCT Pub. No.: WO2015/099778
PCT Pub. Date: Jul. 2, 2015

(65) Prior Publication Data
US 2017/0032122 A1    Feb. 2, 2017

(51) Int. Cl.
H04L 29/06    (2006.01)
G06F 21/56    (2013.01)

(52) U.S. Cl.
CPC ........... *G06F 21/566* (2013.01); *G06F 21/56* (2013.01); *G06F 2221/034* (2013.01)

(58) Field of Classification Search
CPC ... G06F 21/566; G06F 21/56; G06F 2221/034
See application file for complete search history.

(56) References Cited

U.S. PATENT DOCUMENTS

| | | | | |
|---|---|---|---|---|
| 7,191,436 B1 * | 3/2007 | Durr | ........................ | G06F 8/65 |
| | | | | 707/999.005 |
| 7,568,233 B1 * | 7/2009 | Szor | ....................... | G06F 21/564 |
| | | | | 726/22 |
| 7,814,544 B1 * | 10/2010 | Wilhelm | ............... | G06F 21/566 |
| | | | | 719/328 |
| 8,161,548 B1 * | 4/2012 | Wan | ....................... | G06F 21/566 |
| | | | | 713/188 |
| 9,355,246 B1 * | 5/2016 | Wan | ....................... | G06F 21/566 |
| 2003/0212913 A1 * | 11/2003 | Vella | ...................... | G06F 21/563 |
| | | | | 726/24 |
| 2008/0028388 A1 | 1/2008 | Burtscher | | |

(Continued)

FOREIGN PATENT DOCUMENTS

CN    101373501    2/2009
CN    101373502    2/2009

(Continued)

OTHER PUBLICATIONS

International Search Report and Written Opinion, dated Sep. 22, 2014, 9 pages.

(Continued)

*Primary Examiner* — Morshed Mehedi
(74) *Attorney, Agent, or Firm* — Hanley, Flight & Zimmerman, LLC

(57) ABSTRACT

An executable file is loaded into memory. The executable file is analyzed to determine whether one or more dynamically linked libraries are referenced in an import table of the file. It can then be determined whether one or more dynamically linked libraries is adapted to contact a network.

18 Claims, 5 Drawing Sheets

(56) References Cited

U.S. PATENT DOCUMENTS

| | | | | |
|---|---|---|---|---|
| 2009/0126012 A1* | 5/2009 | Treadwell | ............... | G06F 21/51 726/22 |
| 2011/0047618 A1 | 2/2011 | Evans et al. | | |
| 2011/0179484 A1 | 7/2011 | Tuvell et al. | | |
| 2011/0225655 A1 | 9/2011 | Niemela et al. | | |
| 2012/0017275 A1* | 1/2012 | Harmonen | ............... | G06F 21/56 726/24 |
| 2012/0079596 A1 | 3/2012 | Thomas et al. | | |

FOREIGN PATENT DOCUMENTS

| | | |
|---|---|---|
| CN | 101587527 | 11/2009 |
| CN | 101841523 | 9/2010 |
| CN | 102004884 | 4/2011 |
| CN | 102024112 | 4/2011 |
| KR | 1020110070433 | 7/2011 |
| KR | 101086203 B1 | 11/2011 |
| KR | 1020130077621 | 7/2013 |

OTHER PUBLICATIONS

Extended European Search Report, dated May 23, 2017, 8 pages.

Elish, K.O., et al., (2013), "A Static Assurance Analysis of Android Applications", URL:https://pdfs.semanticscholar.org/5a4c/939edb0dc975b3d4a84c16e5a2c98914cfa3.pdf.

Perdisci, R., et al., (2008), "McBoost: Boosting Scalability in Malware Collection and Analysis Using Statistical Classification of Executables", Computer Security Applications Conference, pp. 301-310.

Veeramani R, et al., (2012), "Windows API Based Malware Detection and Framework Analysis", International Journal of Scientific & Engineering Research vol., 3, Issue 3, 6 pages.

European Patent Office, "Office Action," issued in connection with application No. 13900030.1 dated Feb. 12, 2018, 6 pages.

Korean Intellectual Property Office, "Notice of Allowance," issued in connection with application No. 10-2016-7013988, dated May 1, 2018, 3 pages.

Chinese Intellectual Property Office, "Office Action," issued in connection with application No. 201380081268.6 dated Apr. 3, 2018, 19 pages.

* cited by examiner

SEGREGATING EXECUTABLE FILES EXHIBITING NETWORK ACTIVITY

TECHNICAL FIELD

This disclosure relates generally to systems, computer readable media, apparatuses, and methods for determining whether an executable file is exhibiting network activity. More particularly, but not by way of limitation, this disclosure relates to systems, computer readable media, apparatuses, and methods to determine whether an executable file attempts to contact a network during execution of the file.

BACKGROUND

Malicious software, known as "malware," can attack various computing devices via a network, such as the Internet. Malware may include any program or file that is intentionally harmful to a computer, such as Internet bots, computer virus programs, computer worms and other stand-alone malware computer programs that replicate in order to spread to other computers, Trojan horse and other non-self-replicating malware, spyware, or any computer program that gathers information about a computer, its user, or otherwise operates without permission. Various processes and devices have been employed to prevent the problems that malware can cause.

For example, antivirus scanning software is often installed on a computer to scan the particular device for malware. Scanning may be performed by the antivirus software determined by a schedule specified by a user associated with the particular computer, a system administrator, and so forth. Unfortunately, by the time a virus is detected by the antivirus software, some damage on the computer may have already occurred.

In some instances, malware can comprise an Internet "bot." A bot is a software robot configured to remotely control all or a portion of a computer without authorization by the computer's user. Bot related activities can include bot propagation and attacking other computers on a network. Bots commonly propagate by scanning nodes (computers or other digital devices) available on the network to search for a vulnerable target. When a vulnerable computer is scanned, the bot may install a copy of itself on the vulnerable computer. Once installed, the newly replicated bot may continue to seek other computers on the network to infect.

New malware, such as Internet bots, computer worms, Trojan horse programs, as well as numerous other types of malware or spyware is being created daily. In an effort to analyze emerging malware and develop defenses, malware samples are collected to research threat techniques and develop antivirus software. One means of collecting malware samples by researchers is using so-called "honeypots." A honeypot is a decoy Information technology (IT) infrastructure component designed and deployed to be attacked. Another means researchers use to collect malware samples is to download new malware samples from known malicious websites and web addresses.

The number of malware samples obtained by researchers each day continues to rise. Up to thousands of malware samples that need to be executed, either manually or automatically, in order to provide antivirus/intrusion protection service (AV/IPS) detection for the newly created malware may be received by researchers daily. With limited resources at hand for researchers, Identifying and classifying each malware sample as malicious can be a significant challenge. It can also be helpful to identify certain categories of malware samples, such as bots or binaries that can be part of an advanced persistent threat (APT) targeted attack.

Current automated malware analysis systems execute all received malware samples, without focusing on separate categories of the samples. Based on analysis reports, the samples may be classified as bots or malware samples that exhibit network activity. Researchers typically must wait until each sample has executed, which can take between five and ten minutes to execute, to determine which samples may be bots and/or exhibiting network activity.

However, a disadvantage of executing all received malware samples is that this analysis method can be a time consuming and inefficient approach. Allowing researchers to focus on particular type of malware binary may reduce the number of samples that need to be analyzed, and allow researchers to focus on certain subsets of malware samples, which may optimize the sample processing capacity of malware analysis systems.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment. As used herein, the term "a programmable device" can refer to a single programmable device or a plurality of programmable devices working together to perform the function described as being performed on or by a programmable device.

As used herein, the term "a computer system" can refer to a single computer or a plurality of computers working together to perform the function described as being performed on or by the computer system. Similarly, the term "a programmable device" can refer to a single programmable device or a plurality of programmable devices working together to perform the function described as being performed on or by the programmable device, and the term "machine readable medium" can refer to a single physical machine readable medium or a plurality of physical machine readable media that together store the material described as being stored on the machine readable medium.

Figure 1:
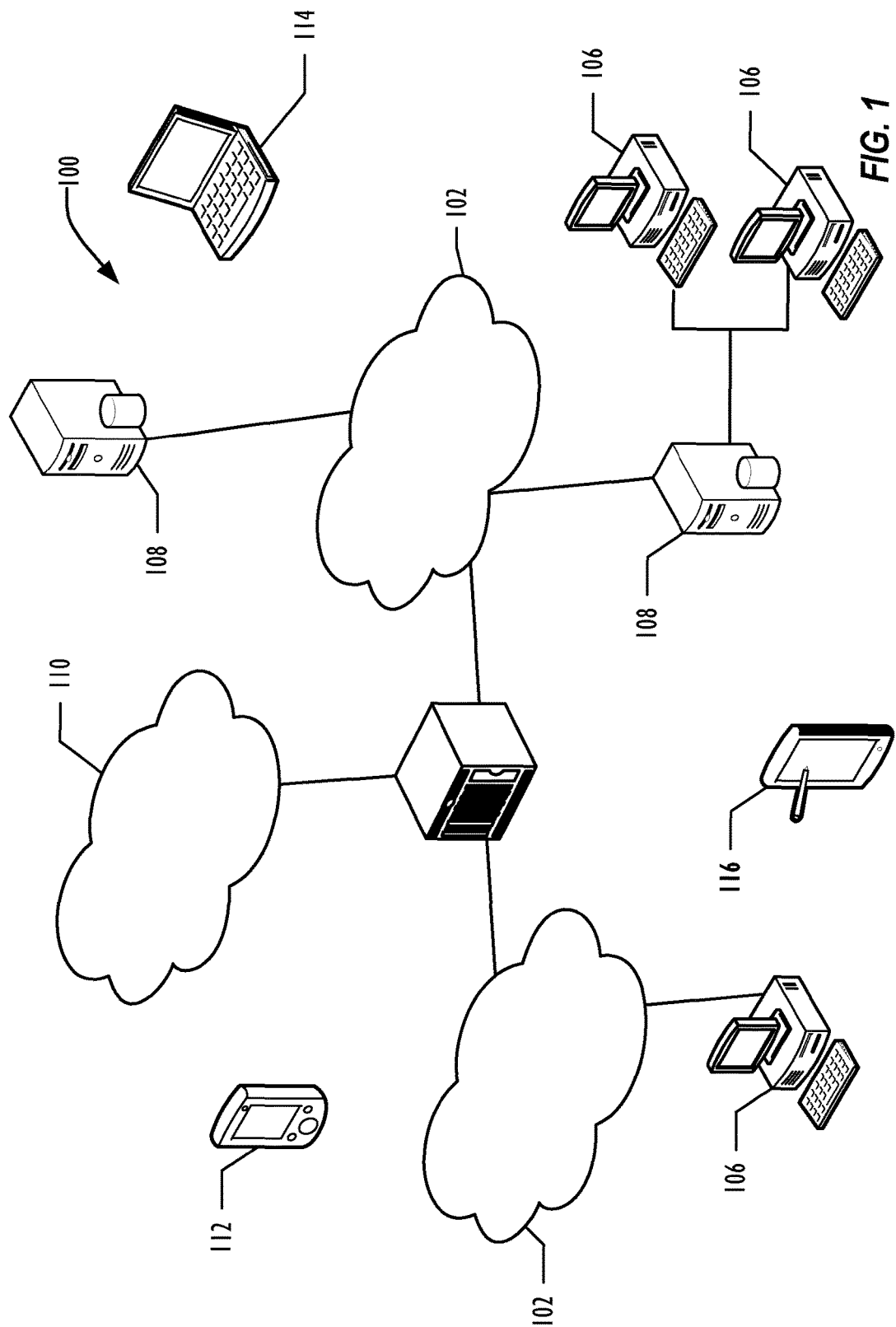
FIG. 1 is a simplified block diagram illustrating a system in which the disclosed techniques may be implemented according to one or more disclosed embodiments.

One proposed solution for efficiently identifying and classifying malware samples is described herein and illustrated in the accompanying Figures. As illustrated in FIG. 1, there is shown generally at 100 an embodiment of a system to determine whether one or more dynamically linked libraries are referenced in an executable file and determine whether one or more dynamically linked libraries is adapted to contact a network. In a general embodiment, the system 100 is adapted to load an executable file into a memory, analyze the executable file to determine whether one or more dynamically linked libraries are referenced, and detect whether one or more dynamically linked libraries is adapted to contact a network responsive to determining whether one or more dynamically linked libraries are referenced.

Referring to FIG. 1, an example system 100 in which the techniques described below may be implemented is illustrated schematically. The system 100 can contain computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 104), end user computers 106, and computer servers 108. The system 100 can also include a cellular network 110 for use with mobile communication devices. Mobile cellular networks support mobile phones and many other types of devices. Mobile devices in the system 100 are illustrated as mobile phones 112, laptops 114, and tablets 116.

Figure 2:
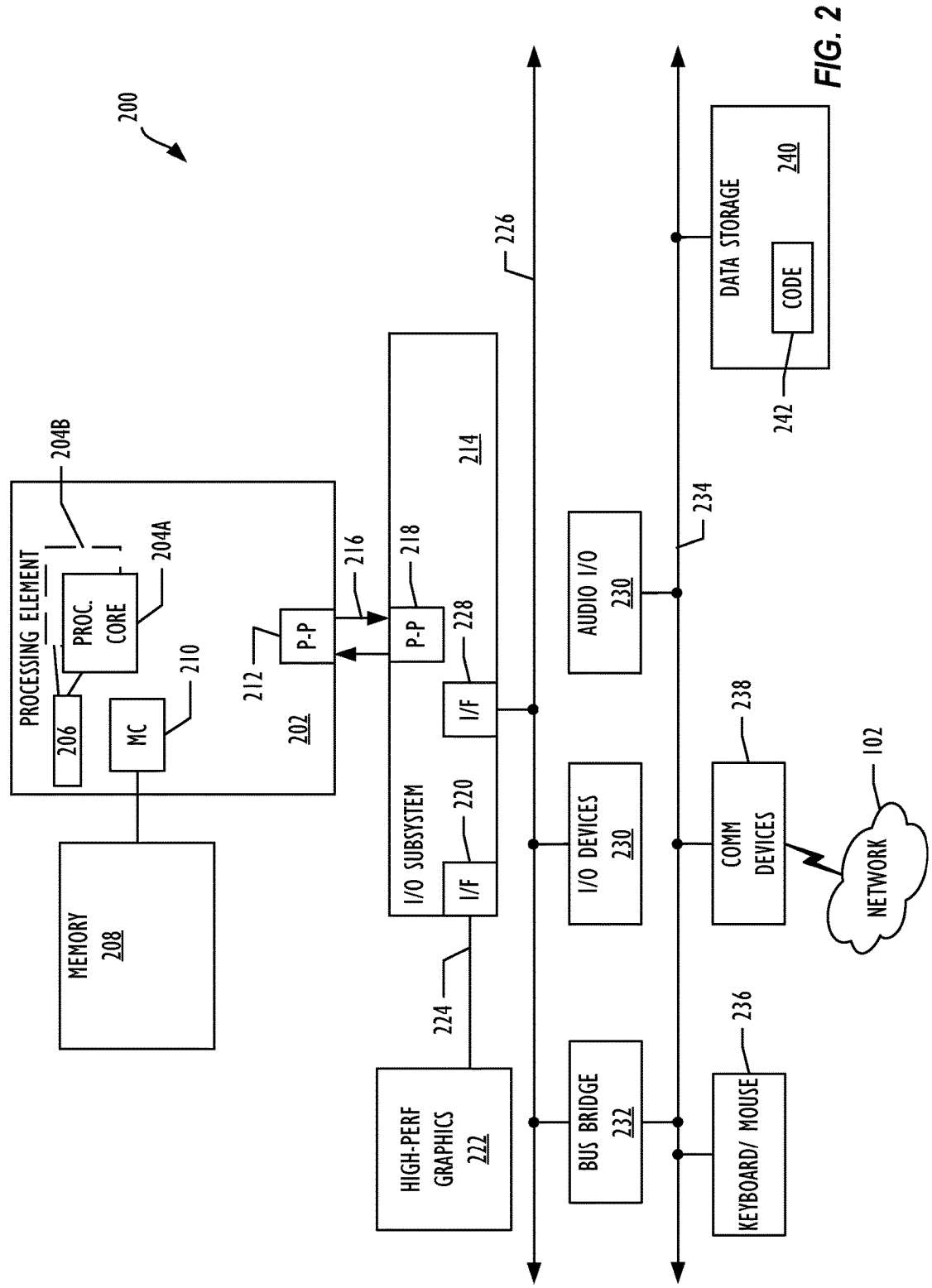
FIG. 2 is a block diagram illustrating a programmable device in which determining whether an executable exhibits network activity can be performed according to one embodiment.

Referring now to FIG. 2, a block diagram illustrates an example programmable device 200 that may employ the generic techniques described herein in accordance with one embodiment. The example programmable device 200 can comprise all or a portion of some of the computer systems of the system 100. For example in some embodiments, the programmable device 200 can comprise all or a portion of some computer systems of the system 100 that can include end user computers 106, servers 108 108, mobile devices 112, 114, 116, or any computing system that may be coupled to the network 102.

The example programmable device illustrated in FIG. 2 can comprise a programmable device 200 that includes one or more processing elements 202. While only one processing element is shown, an embodiment of the programmable device 200 may also include two such processing elements. The processing element 202 may comprise a multicore processor that includes first and second processor cores (i.e., processor cores 204a and 204b). Such cores 204a, 204b may be configured to execute instruction code in a manner similar to that discussed hereinafter. In some embodiments, cores 204a, 204b may be configured to execute instruction code such as an operating system. In some embodiments, the operating system may comprise a graphical interface operating system, such as Windows®, by Microsoft Corporation, of Redmond, Wash. However, other embodiments may use processing elements that are single core processors as desired. In embodiments with multiple processing elements 202, each processing element may be implemented with different numbers of cores as desired.

The processing element 202 may include at least one shared cache 206. The shared cache 206 may store data (e.g., instructions) that are utilized by one or more components of the processing element, such as the cores 204a, 204b. For example, the shared cache may locally cache data stored in a memory 208, for faster access by components of the processing element 202. In one or more embodiments, the shared cache 206 may include one or more mid-level caches, such as level 2 (L2), level 3 (L3), level 4 (L4), or other levels of cache, a last level cache (LLC), or combinations thereof.

While FIG. 2 illustrates a programmable device with one processing element 202 for clarity of the drawing, the scope of the present invention is not so limited and any number of processing elements may be present. Alternatively, one or more of processing elements 202 may be an element other than a processor, such as a graphics processing unit (GPU), a digital signal processing (DSP) unit, a field programmable gate array, or any other programmable processing element. Processing element 202 may be heterogeneous or asymmetric to additional processing elements (not shown). There can be a variety of differences between the processing element 202 and additional processing elements in terms of a spectrum of metrics of merit including architectural, microarchitectural, thermal, power consumption characteristics, and the like. These differences may effectively manifest themselves as asymmetry and heterogeneity amongst any processing elements 202 of the programmable device 200.

The processing element 202 may further include memory controller logic (MC) 210 and point-to-point (P-P) interconnect 212. As illustrated in FIG. 2, MC 210 couples the processing element 202 to a memory 208, which may be a portion of main memory locally attached to the processing element 202. While MC logic 210 is illustrated as integrated into the processing element 202, in some embodiments the MC logic 210 may be discrete logic outside the processing element 202 rather than integrated therein.

Processing element 202 may be coupled to an I/O subsystem 214 via P-P interconnects 212, and 216. As illustrated in FIG. 2, I/O subsystem 214 includes P-P interconnect 218. Furthermore, I/O subsystem 212 includes an interface 220 with a graphics engine 222, which can comprise a high-performance graphics engine. In one embodiment, bus 224 may be used to couple graphics engine 222 to I/O subsystem 214. Alternately, a point-to-point interconnect may couple these components.

In turn, I/O subsystem 214 may be coupled to a first link 226 via an interface 228. In one embodiment, first link 226 may be a Peripheral Component Interconnect (PCI) bus, or a bus such as a PCI Express bus or another I/O interconnect bus, although the scope of the present invention is not so limited.

As illustrated in FIG. 2, various I/O devices 230 may be coupled to first link 226, along with a bridge 232 which may couple first link 226 to a second link 234. In one embodiment, second link 234 may be a low pin count (LPC) bus. Various devices may be coupled to second link 234 including, for example, a keyboard/mouse 236, communication device(s) 238 (which may in turn be in communication with the computer network 102), and a data storage unit 240 such as a disk drive or other mass storage device which may include code 242, in one embodiment. The code 242 may include instructions for performing embodiments of one or more of the techniques described above. Further, an audio I/O device 230 may be coupled to second link 234.

Note that other embodiments are contemplated. For example, instead of the point-to-point architecture of FIG. 2, a system may implement a multi-drop bus or another such communication topology. Although links 226 and 234 are illustrated as busses in FIG. 2, any desired type of link can be used. Also, the elements of FIG. 2 may alternatively be partitioned using more or fewer integrated chips than illustrated in FIG. 2.

Figure 3:
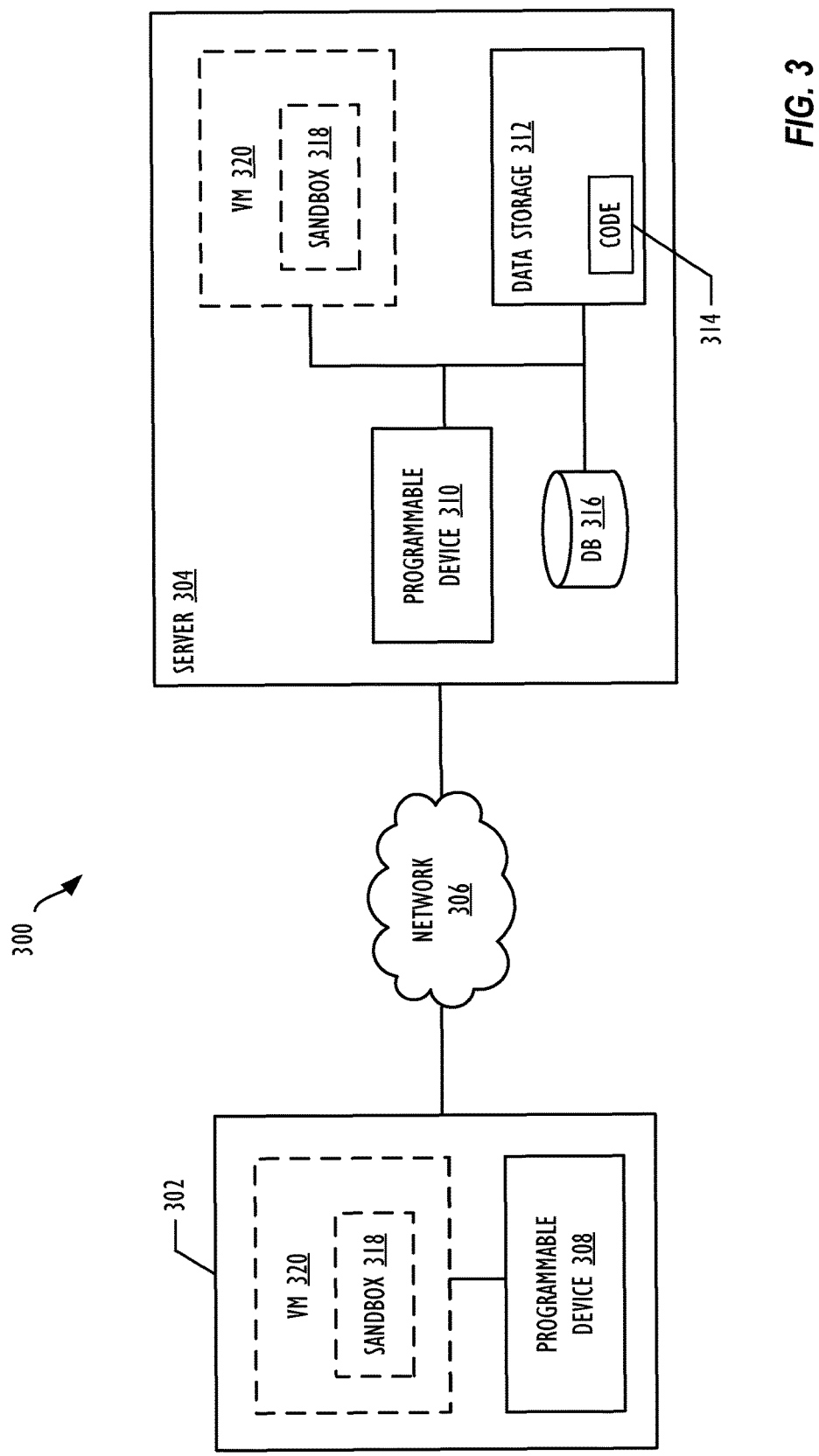
FIG. 3 is a block illustrating an example computer system and an example computer server coupled via a network according to one or more disclosed embodiments.

Referring now to FIG. 3, a block diagram illustrates one embodiment of an example system 300. The system 300 can include an example computer system 302 and an example computer server 304 interconnected via a computer network 306. A programmable device 308, that can be similar or different to the programmable device 200 of FIG. 2, or alternatives thereof, can be embodied in the computer system 302. Certain aspects of the programmable device 308 have been omitted from FIG. 3 in order to avoid obscuring other aspects of FIG. 3.

In certain embodiments, the server 304 can include one or more programmable devices 310, which can be similar or different to the programmable device 200 of FIG. 2, or alternatives thereof. While FIG. 3 illustrates a server 304 with one programmable device 310 for clarity of the drawing, the scope of the present invention is not so limited and one or more programmable devices 310 may be present in one or more servers 304 of the system 300.

One or more mass storage devices, such as data storage unit 312 or other mass storage device which may include code 314 can be embodied in the server 304. The code 314 may include instructions for performing embodiments of one or more of the techniques described above. A data store 316 may be used for storing data. Any desired way for storing data, including dynamic object data, may be used in the data store 316. The data store 316 may be implemented and organized in any desired manner.

As an option, the system 300 can include a sandbox 318, shown in FIG. 3. In some optional embodiments, more than one sandbox 318 may be included. The sandbox 318 can provide a technique for containing and running potentially malicious, unknown, or at-risk software within an area of containment. The sandbox 318, and any functions thereof can be controlled by a programmable device, such as the programmable device 310 of the server 304, or the programmable device 308 of the computer 302. Operations performed by software (executable applications) running within the sandbox 318 are limited to affecting only the sandbox 318 and not larger areas of programmable devices 308, 310, computer 302, server 304, mobile devices, or any portion of system 300, that may host all or some portion of the sandbox 318, or other applications that may be running on the computer 302, server 304, or anywhere within the system 300. The sandbox 318 can be configured to provide various levels of restriction of the operations attempted by an executable application running therein.

As an option, the execution environment of the sandbox 318 can be a segmented portion, or portions, of one or more host computing systems, such as the computer 302, server 304, or anywhere within the system 300, that shield executable applications running in the sandbox 318 from directly accessing certain resources or devices that may be available within the execution environment. In some embodiments, the execution environment of the sandbox 318 can be scratch space on one or more mass storage devices 312. In some embodiments, the sandbox 318 may be executed on a virtual machine 320. The virtual machine 320 can emulate all or a portion of the programmable device 308, 310, computer 302, server 304, or any computer system that may host the virtual machine 320.

The techniques described herein may take advantage of determining whether an executable, or any software application capable of being run as all or a portion of a program, exhibits network activity. The described techniques may allow researchers to quickly classify executables, without waiting for executables to fully execute, which may significantly reduce the time required for processing file samples and provide an efficient approach for analyzing executable samples.

Figure 4:
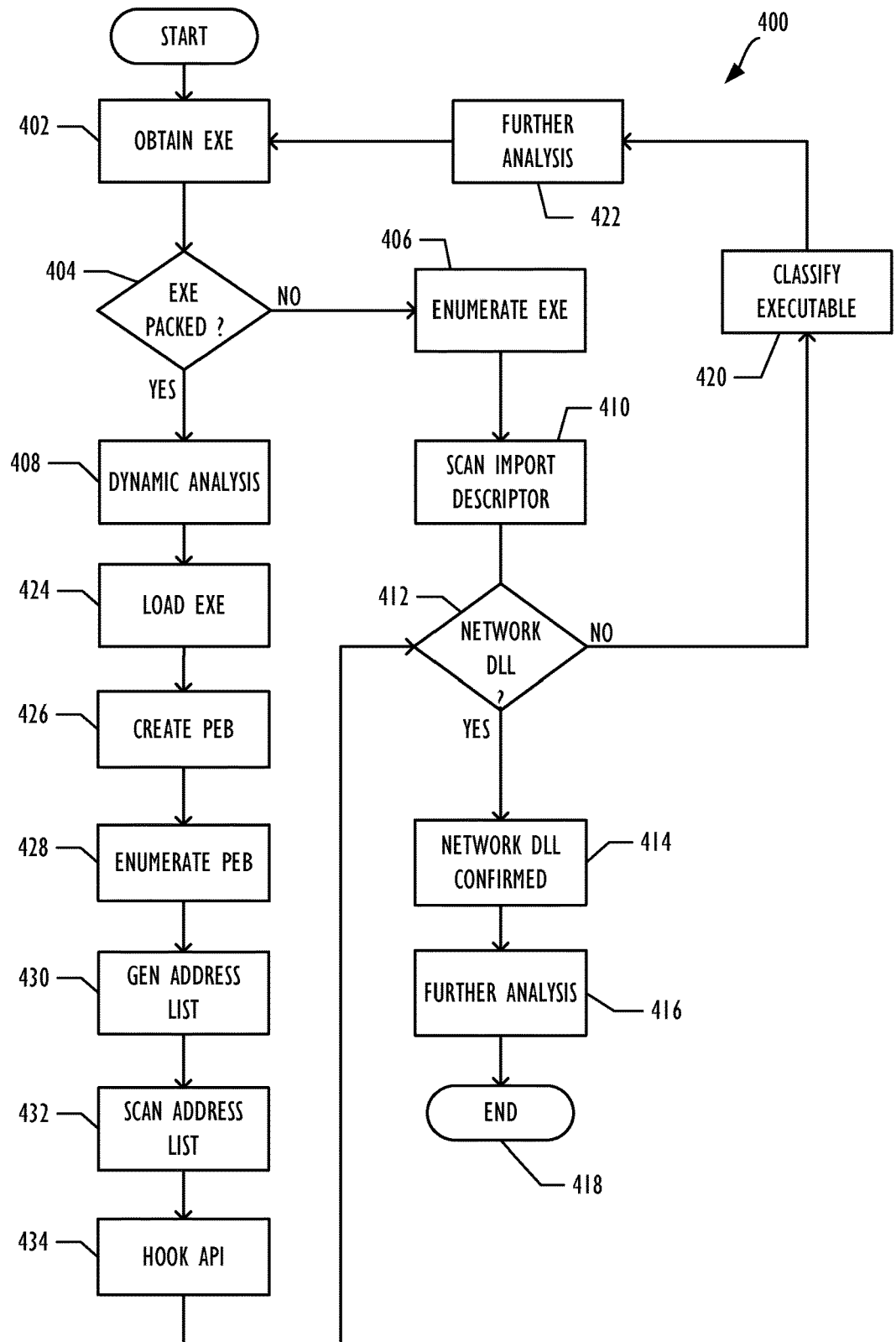
FIG. 4 illustrates a flowchart illustrating an example of a generic technique for determining whether an executable exhibits network activity according one embodiment.

Referring to FIG. 4, there is a flowchart, shown generally at 400, illustrating an example of a generic technique for determining whether an executable exhibits network activity. As an option, the techniques described may be carried out in the context of the architecture and environment of the Figures. However, the techniques described may be carried out in any desired environment.

In operation 402 an executable is obtained. The executable may be obtained via any known means. For example, the executable can be received from a remote computer system via a network. The executable can compromise a sample executable that may be unknown, potentially at-risk, and may be potentially malicious. The executable may be an executable file, or any software application capable of being run as all or a portion of a software program. As an option, the executable may comprise a portable executable (PE) file. The executable may be received for processing to detect whether the executable exhibits network activity. In some embodiments, use by the executable of one or more dynamically linked libraries (DLLs). A DLL is a dynamically linked library that contains code and data that can be used by more than one executable at the same time, so that more than one executable can use the functionality that is contained in a single DLL. The techniques described hereinafter may determine whether the executable contains one or more dynamically linked libraries that are adapted to contact a network.

In operation 404, whether the executable is packed is detected. The executable can be read, in some embodiments, to determine if the executable is packed. If the executable is not packed, then the process continues to operation 406, and if the executable is packed, the process continues to operation 408. As an option, in embodiments where the executable is not packed, the executable may be enumerated, in operation 406. Enumerating the executable can comprise scanning, or reading, the unpacked executable to generate an address list of loaded modules, process startup arguments, instructions such as API calls, signatures of code samples, and an import descriptor data structure.

The import descriptor data structure can comprise an array of import descriptors, where an import descriptor can be provided for each dynamically linked library (DLL) loaded by the executable. In embodiments, where the operating system may comprise a Windows®, or Windows® based, operating system, the an import descriptor data structure can comprise an "IMAGE_IMPORT_DESCRIPTOR." In embodiments, where the operating system may not comprise a Windows®, or Windows® based, operating system, the an import descriptor data structure can comprise any suitable import descriptor data structure.

In operation 410, the import descriptor data structure of the executable can be scanned for any dynamically linked libraries (DLLs) adapted to contact a network or otherwise exhibit network activity. In some embodiments, the import descriptor data structure can be scanned by machine, such as a computing system, while in optional embodiments, the import descriptor data structure can be scanned manually by researchers.

For an executable to use a system call, such as an Application Programming Interface (API) call, the executable must first import a DLL that exposes the API call, and then run the API. Documentation is publically available that indicates which DLLs exposes various API calls. DLLs that expose network related API calls, such as a call to open a web browser or a particular URL, are determined to comprise DLLs that are adapted to contact a network or exhibit network activity. Thus, the address list can be scanned for one or more DLLs that expose network related API calls, or otherwise exhibit network activity. In some embodiments, the address list can be scanned for predetermined, or known, DLLs that exhibit network activity. Some of these DLLs can include, but are in no way limited to, "ulrmon.dll," "mswsock.dll," "ws2_32.dll," and "mscoree.dll," among other DLLs that exhibit network activity. As an option, DLLs referenced in the executable may be compared to a list of DLLs that are adapted to contact a network. A list of DLLs may be stored anywhere within the system that is accessible by the techniques described herein. In one example embodiment, a list of DLLs that exhibit network activity may be stored in a data store, such as the data store 316 illustrated in FIG. 3.

In operation 412, it is determined whether the presence of one or more DLLs that exhibit network activity is detected by scanning the import descriptor data structure. If at least one DLL that exhibits network activity is detected, the process continues to operation 414 where it is confirmed that the executable may exhibit network activity. Upon confirmation that the executable exhibits network activity, as an option only, one or more actions regarding the executable may occur, in operation 416. As an option, the executable may be classified a file that may potentially be malware. Classifying the executable as potential malware may facilitate further analysis on the executable. For example, additional analysis may be performed on the executable to determine if the executable exhibits one or more behaviors that may indicate that the executable may potentially comprise malware. As an option, the executable may be added to a data store that may comprise a listing of executables that may be untrusted or potentially malicious. The process then ends in operation 418.

Returning to operation 412, if it is determined that no DLLs that are adapted to contact a network or exhibit network activity are referenced by the executable in the addresses list generated when the executable was enumerated, the process continues to operation 420, where the executable may be classified. In some embodiments, the executable may simply be classified as an executable that does not exhibit network activity. However, the executable may still potentially be malware or otherwise be un-trusted. The process continues to operation 422, where, as an option, further analysis may be performed on the executable. As an option, additional analysis may be performed on the executable to determine if the executable exhibits one or more behaviors that may indicate that the executable may potentially comprise malware, even though the executable does not exhibit network activity. Other processing and analysis of the executable may be performed as discussed. The process then returns to operation 402.

In operation 404, if the executable is packed, dynamic analysis may be performed in operation 408. In some embodiments, dynamic analysis of the executable may comprise executing the file in a contained environment, such as a sandbox 318, illustrated in FIG. 3. Processing the executable in a contained environment, such as the sandbox 318, may prevent the executable from potentially adversely affecting other areas of a computer, server, mobile devices, or any portion of a system, and/or other applications that may be running on a system.

In operation 424, the executable can be loaded into a memory. The memory may compromise a cache memory or all or a portion of a main memory. The memory may also comprise a virtual memory of a virtual machine 320, illustrated in FIG. 3. The dynamic linker can load any dynamically linked libraries (DLLs) that the executable references and may also list the functions required from each DLL. A DLL is a dynamically linked library that contains code and data that can be used by more than one executable at the same time, so that more than one executable can use the functionality that is contained in a single DLL.

In operation 426, as an option, a process environment block (PEB) for the executable can be created. The PEB may be created by an operating system that may be processing the executable, upon initially launching the executable, according to some optional embodiments. The PEB comprises a data structure that is created and used by the operating system when the executable is initially launched to load various modules indicated by the executable as including DLLs. DLLs loaded by the PEB can include, but are not limited to, NTDLL.dll, Kernel32.dll, and other known DLLs. The PEB can provide readable access to the list of modules, process startup arguments, and imported DLLs that may be loaded as the executable is initializing. By scanning the PEB, researchers can obtain a list of base addresses of any imported DLLs that may be loaded as the executable is initializing.

As DLLs are imported, in operation 428, the PEB can be enumerated in some embodiments. Enumerating the PEB can generate an address list of any dynamically linked libraries (DLLs) loaded by executable, in operation 430. The generated address list can be scanned in operation 432, for one or more DLLs that exhibit network activity. For example, the address list generated by enumerating the PEB is scanned for one or more DLLs that expose network related API calls, or otherwise exhibit network activity. In some embodiments, the address list can be scanned for predetermined, or known, DLLs that exhibit network activity, as discussed previously.

As an option, in operation 434, in instances where the address list generated by enumerating the PEB does not reference at least one DLL that is either adapted to contact a network, or otherwise exhibits network activity, various DLL functions may be hooked as they are loaded to determine if the DLL exhibits network activity. As certain DLLs are loaded, the API associated with the DLLs may be hooked to interrupt processing of the API to determine if the DLL is either adapted to contact a network, or otherwise exhibits network activity. In some optional embodiments, the API associated with certain DLLs may be hooked as the PEB is being enumerated. As an optional alternative, the API associated with certain DLLs may be hooked instead of or before enumerating the PEB. The various DLL functions that may be hooked include, but are not limited to: "LoadLibrary," "LoadLibraryA," "LoadLibraryEX," "LoadModule," and "LoadPackagedLibrary," and/or similar API calls, among other known DLL functions.

The executable can issue function parameters, that comprise instructions, to an API that instruct the API to perform a process, or processes, other than or in addition to the process or process which the API is intended to perform.

Thus, the function parameters to can instruct the API to perform one or more unintended processes. In addition to the API receiving the function parameters issued by the executable, the process receives the function parameters as well. Using the function parameters, the process is able to determine a target process the executable is attempting to control. If the target process comprises an API call configured to connect to a network, it is determined that the executable is network active, in operation 412.

For example, the executable intends to connect to a URL, thus exhibiting network activity. The executable may attempt to control an API call from an operating system DLL in order to connect to the URL. The executable may attempt control of a suitable API, such as the "InternetOpenUrlA" API, or similar network active API, from an operating system DLL, such as "wininet.dll". To accomplish this, the executable may first attempt to load wininet.dll using an API call for example, such as the LoadLibraryA API. As the process loads wininet.dll, the LoadLibraryA API is hooked. The executable attempts to control the LoadLibraryA API, by issuing function parameters to the API.

The function parameters issued to the API by the executable are received by both the process and the LoadLibraryA API, since LoadLibraryA API is hooked by the process. These function parameters indicate that the executable is attempting to load and a target API, such as the InternetOpenUrlA API. As it is known that the InternetOpenUrlA API comprises an API call configured to access a network, such as the Internet, it is determined that the executable exhibits network activity. Similarly, if the executable attempts to load other target API calls configured to access a network, it is determined that the executable exhibits network activity, in operation 412.

If at least one DLL that exhibits network activity is detected, the process continues to operation 414 where it is confirmed that the executable may exhibit network activity. Upon confirmation that the executable exhibits network activity, as an option only, one or more actions regarding the executable may occur, in operation 416. As an option, the executable may be classified a file that may potentially be malware. Classifying the executable as potential malware may facilitate further analysis on the executable. For example, additional analysis may be performed on the executable to determine if the executable exhibits one or more behaviors that may indicate that the executable may potentially comprise malware. As an option, the executable may be added to a data store that may comprise a listing of executables that may be untrusted or potentially malicious. The process then ends in operation 418.

Returning to operation 412, if it is determined that no DLLs referenced in the executable exhibit network activity, the process continues to operation 420, where the executable may be classified. In some embodiments, the executable may simply be classified as an executable that does not exhibit network activity. However, the executable may still potentially be malware or otherwise be un-trusted. The process continues to operation 422, where, as an option, further analysis may be performed on the executable. As an option, additional analysis may be performed on the executable to determine if the executable exhibits one or more behaviors that may indicate that the executable may potentially comprise malware, even though the executable does not exhibit network activity. Other processing and analysis of the executable may be performed as discussed. The process then returns to operation 402.

Figure 5:
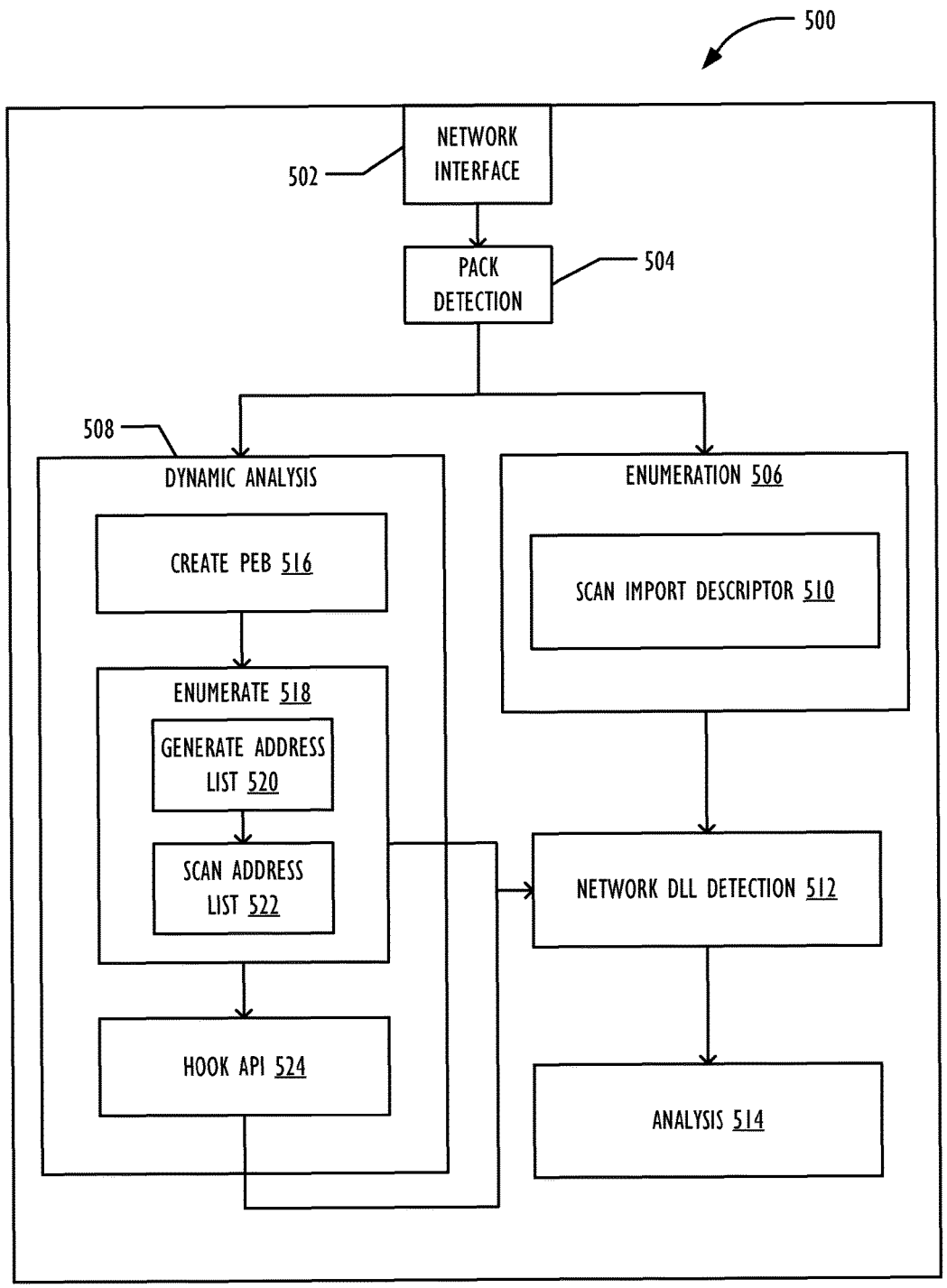
FIG. 5 illustrates is a block diagram illustrating an example of a generic technique for determining whether an executable exhibits network activity according one embodiment.

FIG. 5 is a block diagram 500 illustrating an example of a generic technique for determining whether an executable exhibits network activity according to techniques described above according to one embodiment. A network interface 502 provides network connectivity to a network where an executable that exhibits network activity can be received.

A pack detection module 504 can receive an executable and detect whether the executable is packed. If the executable is not packed, in may be sent to an enumeration module 506; if the executable is packed, it can be sent to a dynamic analysis module 508.

As an option, in embodiments where the executable is not packed, the executable may be enumerated, by the enumeration module 506. Enumerating the executable can include scanning, or reading, an import descriptor data structure module 510 of the executable. The import descriptor data structure module 510 can provide an array of import descriptors, where an import descriptor can be provided for each dynamically linked library (DLL) loaded by the executable.

As an option, a network DLL detection module 512 can scan the array of import descriptors provided in the import descriptor data structure module 510, for each dynamically linked library (DLL) loaded by the executable. The network DLL detection module 512 may scan the array for predetermined, or known, DLLs that exhibit network activity, in optional embodiments. Some of these DLLs can include, but are in no way limited to, "ulrmon.dll," "mswsock.dll," "ws2_32.dll," and "mscoree.dll," among other DLLs that are adapted to contact a network or otherwise exhibit network activity.

In some embodiments, if at least one DLL adapted to contact a network or exhibit network activity, is detected by the network DLL detection module 512, the executable is determined to exhibit network activity. An analysis module 514 may then receive the executable from the network DLL detection module 512. The analysis module 514 may classify the executable as potential malware. Classifying the executable as potential malware may facilitate further analysis on the executable. For example, additional analysis may be performed on the executable, by the analysis module 514, to determine if the executable exhibits one or more behaviors that may indicate that the executable may potentially comprise malware. As an option, the executable may be added to a data store that may comprise a listing of executables that may be untrusted or potentially malicious.

If an executable is determined to be packed by the pack detection 504, it can be received by the dynamic analysis module 508. In some embodiments, the dynamic analysis module 508 can include a create PEB module 516, an enumeration module 518, that can include an address list generation module 520, a scanning module 522, and a hook API module 524.

The create PEB module 516 can generate a process environment block (PEB) of the executable, when the executable is initially launched. The PEB can provide readable access to a list of modules, imported DLLs, and other information regarding the executable. Upon creation of the PEB, an address list generation module 520, of the enumeration module 518, can be adapted to scan the PEB and generate an address list. Once the address list is generated, the scanning module 522 may be adapted to scan the generated address list of the PEB for any loaded dynamically linked libraries (DLLs). As an option, the scanning module 522 can scan the address list for predetermined, or known, DLLs that exhibit network activity, as discussed previously. In some embodiments, the network DLL detection module 512 can then receive the scanned address list from the scanning module 522, and then determine if at least one DLL that may have been detected in the address list may exhibit network activity.

As an option, in instances where the address list generated by the address list generation module 520 does not reference at least one DLL that is either adapted to contact a network, or otherwise exhibits network activity, various DLL functions may be hooked by the hook API module 524 as they are loaded, to determine if the DLL exhibits network activity. As certain DLLs are loaded, the API associated with the DLLs may be hooked by the hook API module 524, to interrupt processing of the API to determine if the DLL is either adapted to contact a network, or otherwise exhibits network activity. In some optional embodiments, the API associated with certain DLLs may be hooked as the PEB is being enumerated. As an optional alternative, the API associated with certain DLLs may be hooked by the hook API module 524 instead of or before enumerating the PEB. The various DLL functions that may be hooked include, but are not limited to: "LoadLibrary," "LoadLibraryA," "LoadLibraryEX," "LoadModule," and "LoadPackagedLibrary," and/or similar API calls, among other known DLL functions.

The executable can issue function parameters, that comprise instructions, to an API that instruct the API to perform a process, or processes, other than or in addition to the process or process which the API is intended to perform. Thus, the function parameters can instruct the API to perform one or more unintended processes. In addition to the API receiving the function parameters issued by the executable, the hook API module 524 receives the function parameters as well. Using the function parameters, a target process the executable is attempting to control can be determined.

In some embodiments, the network DLL detection module 512 can then receive an executable from the hook API module 524, and determine if a target process the executable is attempting to control may exhibit network activity. If the executable is determined to exhibit network activity, by the network DLL detection module 512, the executable may be sent to an analysis module 514. As an option, the analysis module 514 may classify the executable as potential malware. Classifying the executable as potential malware may facilitate further analysis on the executable. For example, additional analysis may be performed on the executable to determine if the executable exhibits one or more behaviors that may indicate that the executable may potentially comprise malware. As an option, the executable may be added to a data store that may comprise a listing of executables that may be untrusted or potentially malicious.

EXAMPLES

The following examples pertain to further embodiments. Example 1 is a machine readable medium, on which are stored instructions, comprising instructions that when executed cause one or more programmable devices to load an executable file; detect use by the executable of a dynamically linked library that is adapted to perform network activity; and perform malware analysis responsive to the detection.

Example 2 includes the subject matter of example 1, and further comprises instructions that when executed cause the one or more programmable devices to detect use by the executable of a dynamically linked library that is adapted to perform network activity comprise instructions that when executed cause the one or more programmable devices to identify a dynamically linked library referenced by the executable; and determine whether the dynamically linked library performs network activity.

Example 3 includes the subject matter of example 1, and further comprises instructions that when executed cause one or more programmable devices to determine whether the executable file is packed.

Example 4 includes the subject matter of example 3, wherein the instructions that when executed cause one or more programmable devices to determine whether the executable is packed comprise instructions that when executed cause the one or more programmable devices to scan the executable, responsive to determining that the executable is unpacked, for a dynamically linked library is adapted to perform network activity.

Example 5 includes the subject matter of example 3, wherein the instructions that when executed cause one or more programmable devices to determine whether the executable is packed comprise instructions that when executed cause the one or more programmable devices to process the executable responsive to determining that the executable is packed; and determine whether one or more dynamically linked libraries performs network activity.

Example 6 includes the subject matter of example 5, wherein the instructions that when executed cause one or more programmable devices to determine whether one or more dynamically linked libraries performs network activity comprise instructions that when executed cause the one or more programmable devices to enumerate the executable to detect whether one or more dynamically linked libraries adapted to perform network activity is referenced by the executable.

Example 7 includes the subject matter of example 6, wherein the instructions that when executed cause one or more programmable devices to enumerate the executable to detect whether one or more dynamically linked libraries adapted to perform network activity is referenced by the executable comprise instructions that when executed cause the one or more programmable devices to hook processing of the executable responsive to detecting a dynamically linked library adapted to perform network activity.

Example 8 includes the subject matter of example 6, wherein the instructions that when executed cause one or more programmable devices to enumerate the executable to detect whether one or more dynamically linked libraries adapted to perform network activity is referenced by the executable comprise instructions that when executed cause the one or more programmable devices to allow processing of the executable responsive to not detecting a dynamically linked library adapted to perform network activity.

Example 9 includes the subject matter of example 8, wherein the instructions that when executed cause one or more programmable devices to allowing processing of the executable responsive to not detecting a dynamically linked library adapted to perform network activity comprise instructions that when executed cause the one or more programmable devices to hook processing of the executable responsive to detecting network activity by a dynamically linked library.

Example 10 includes the subject matter of examples 5-9, wherein the executable is processed in a sandbox.

Example 11 includes the subject matter of examples 1-10, wherein the executable comprises a portable executable file.

Example 12 is a method that comprises loading an executable; detecting use by the executable of a dynamically linked library that is adapted to perform network activity; and performing malware analysis responsive to the detection.

Example 13 includes the subject matter of example 12, and further comprises determining whether the executable is packed; and scanning the executable, responsive to determining that the executable is unpacked, for a dynamically linked library is adapted to perform network activity.

Example 14 includes the subject matter of example 12, and further comprises determining whether the executable is packed; processing the executable responsive to determining that the executable is packed; and determining whether one or more dynamically linked libraries performs network activity.

Example 15 includes the subject matter of example 14, and further comprises enumerating the executable to detect whether one or more dynamically linked libraries adapted to perform network activity is referenced by the executable.

Example 16 includes the subject matter of example 15, and further comprises hooking processing of the executable responsive to detecting a dynamically linked library adapted to perform network activity.

Example 17 includes the subject matter of example 15, and further comprises allowing processing of the executable responsive to not detecting a dynamically linked library adapted to perform network activity; and hooking processing of the executable responsive to detecting network activity by a dynamically linked library.

Example 18 includes the subject matter of examples 14-17, wherein the executable is processed in a sandbox.

Example 19 includes the subject matter of examples 12-18, wherein the executable comprises a portable executable.

Example 20 is an apparatus that comprises one or more processing elements; and a memory, coupled to the one or more processing elements; an executable analyzer loaded into memory, the executable analyzer configured to detect dynamically linked libraries; a dynamically linked library analyzer configured to determine whether one or more detected dynamically linked libraries is adapted to perform network activity; and perform malware analysis responsive to the detection.

Example 21 includes the subject matter of example 20, wherein the dynamically linked library analyzer is further configured to identify one or more dynamically linked libraries adapted to perform network activity referenced by the executable; and determine whether the one or more dynamically linked libraries performs network activity.

Example 22 includes the subject matter of example 21, and further comprises the executable analyzer further configured to determine whether the executable is packed; and the dynamically linked library analyzer further configured to scan the executable for a dynamically linked library is adapted to perform network activity responsive to determining that the executable is unpacked.

Example 23 includes the subject matter of example 21, and further comprises wherein the executable analyzer is further configured to determine whether the executable is packed; and process the executable responsive to determining that the executable is packed; and wherein the dynamically linked library analyzer is further configured to determine whether one or more dynamically linked libraries performs network activity.

Example 24 includes the subject matter of example 23, wherein the executable analyzer is further configured to enumerate the executable to detect whether one or more dynamically linked libraries adapted to perform network activity is referenced by the executable.

Example 25 includes the subject matter of example 24, wherein the dynamically linked library analyzer is further configured to hook processing of the executable responsive to detecting a dynamically linked library adapted to perform network activity.

Example 26 includes the subject matter of example 24, wherein the dynamically linked library analyzer is further configured to allow processing of the executable responsive to not detecting a dynamically linked library adapted to perform network activity.

Example 27 includes the subject matter of example 26, wherein the dynamically linked library analyzer is further configured to hook processing of the executable responsive to detecting network activity by a dynamically linked library.

Example 28 is a system that comprises computing means for loading an executable into a memory; computing means for detecting whether one or more dynamically linked libraries of the executable are adapted to perform network activity; and computing means for performing malware analysis responsive to the detection.

Example 29 includes the subject matter of example 28, and further comprises computing means for identifying one or more dynamically linked libraries adapted to perform network activity referenced by the executable; and determining means for determining whether the one or more dynamically linked libraries performs network activity.

Example 30 includes the subject matter of example 28, and further comprises computing means for determining whether the executable is packed; and scanning means for scanning the executable for a dynamically linked library is adapted to perform network activity responsive to determining that the executable is unpacked.

Example 31 includes the subject matter of example 28, and further comprises computing means for determining whether the executable is packed; processing means for processing the executable responsive to determining that the executable is packed; and determining means for determining whether one or more dynamically linked libraries performs network activity.

Example 32 includes the subject matter of example 31, and further comprises computing means for hooking processing of the executable responsive to detecting a dynamically linked library adapted to perform network activity.

Example 33 includes the subject matter of example 22, and further comprises computing means for allowing processing of the executable responsive to not detecting a dynamically linked library adapted to perform network activity.

Example 34 includes the subject matter of example 33, and further comprises computing means for hooking processing of the executable responsive to detecting network activity by a dynamically linked library.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment"

or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. An apparatus comprising:
    one or more processing elements; and
    a memory, coupled to the one or more processing elements;
    a dynamically linked library (DLL) analyzer loadable into the memory, comprising instructions that when executed cause the one or more processing elements to:
        determine whether one or more DLLs used by an executable file are adapted to perform network activity;
        scan an import descriptor data structure module of the executable file for a reference to a dynamically linked library known to perform network activity;
    an executable file analyzer loadable into the memory, comprising instructions that when executed cause the one or more processing elements to:
        determine whether the executable file is packed or unpacked;
        enumerate the executable file responsive to a determination that the executable file is unpacked;
        detect use of one or more DLLs responsive to a determination that the executable file is packed;
        invoke the DLL analyzer to process the executable file, responsive to detecting use of one or more executable DLLs; and
        perform malware analysis responsive to the determination by the DLL analyzer that the one or more DLLs are adapted to perform network activity.

2. The apparatus of claim 1, wherein the DLL analyzer further comprises instructions that when executed cause the one or more processing elements to:
    identify one or more dynamically linked libraries adapted to perform network activity referenced by the executable file; and
    determine whether the one or more dynamically linked libraries perform network activity.

3. The apparatus of claim 1, wherein the DLL analyzer further comprises instructions that when executed cause the one or more processing elements to:
    hook processing of the executable file responsive to determining at least one dynamically linked library adapted to perform network activity is used by the executable file.

4. The apparatus of claim 1, wherein the memory further comprises instructions to cause the one or more processing elements to:
    allow execution of the executable file responsive to determining no dynamically linked library adapted to perform network activity is used by the executable file.

5. The apparatus of claim 4, wherein the DLL analyzer further comprises instructions that when executed cause the one or more processing elements to:
    hook execution of the executable file responsive to identifying network activity by a dynamically linked library.

6. The apparatus of claim 1, wherein the executable file comprises a portable executable file.

7. A non-transitory computer readable storage medium comprising computer readable code comprising:
    a dynamically linked library (DLL) analyzer, comprising instructions that when executed cause the one or more processing elements to:
        determine whether one or more DLLs used by an executable file are adapted to perform network activity;
        scan an import descriptor data structure module of the executable file for a reference to a dynamically linked library known to perform network activity;
    an executable file analyzer, comprising instructions that when executed cause the one or more processing elements to:
        determine whether the executable file is packed or unpacked;
        enumerate the executable file responsive to a determination that the executable file is unpacked;
        detect use of one or more DLLs responsive to a determination that the executable file is packed;
        invoke the DLL analyzer to process the executable file, responsive to detecting use of one or more executable DLLs; and
        perform malware analysis responsive to the determination by the DLL analyzer that the one or more DLLs are adapted to perform network activity.

8. The non-transitory computer readable medium of claim 7, wherein the DLL analyzer further comprises instructions that when executed cause the one or more processing elements to:
    identify one or more dynamically linked libraries adapted to perform network activity referenced by the executable file; and
    determine whether the one or more dynamically linked libraries perform network activity.

9. The non-transitory computer readable medium of claim 7, wherein the DLL analyzer further comprises instructions that when executed cause the one or more processing elements to:
    hook processing of the executable file responsive to determining at least one dynamically linked library adapted to perform network activity is used by the executable file.

10. The non-transitory computer readable medium of claim 7, further comprising instructions to cause the one or more processing elements to:
    allow execution of the executable file responsive to determining no dynamically linked library adapted to perform network activity is used by the executable file.

11. The non-transitory computer readable medium of claim 10, wherein the DLL analyzer further comprises instructions that when executed cause the one or more processing elements to:
    hook execution of the executable file responsive to identifying network activity by a dynamically linked library.

12. The non-transitory computer readable medium of claim 7, wherein the executable file comprises a portable executable file.

13. A method comprising:
- determining whether one or more dynamically linked libraries (DLLs) used by an executable file are adapted to perform network activity;
- scanning an import descriptor data structure module of the executable file for a reference to a dynamically linked library known to perform network activity;
- determining whether the executable file is packed or unpacked;
- enumerating the executable file responsive to a determination that the executable file is unpacked;
- detecting use of one or more DLLs responsive to a determination that the executable file is packed;
- invoking a DLL analyzer to process the executable file, responsive to detecting use of one or more executable DLLs; and
- performing malware analysis responsive to the determination by the DLL analyzer that the one or more DLLs are adapted to perform network activity.

14. The method of claim 13, further comprising:
- identifying one or more dynamically linked libraries adapted to perform network activity referenced by the executable file; and
- determining whether the one or more dynamically linked libraries perform network activity.

15. The method of claim 13, further comprising:
- hooking processing of the executable file responsive to determining at least one dynamically linked library adapted to perform network activity is used by the executable file.

16. The method of claim 13, further comprising:
- allowing execution of the executable file responsive to determining no dynamically linked library adapted to perform network activity is used by the executable file.

17. The method of claim 16, further comprising:
- hooking execution of the executable file responsive to identifying network activity by a dynamically linked library.

18. The method of claim 13, wherein the executable file comprises a portable executable file.

* * * * *